United States Patent [19]

Nishimura et al.

[11] Patent Number: 5,942,202
[45] Date of Patent: Aug. 24, 1999

[54] STABILIZED AQUEOUS SOLUTION OF HYDROGEN PEROXIDE

[75] Inventors: Yoshio Nishimura; Yoshitsugu Minamikawa; Jun Kokubu; Chiharu Nishizawa; Satoshi Okabe; Naoko Matsuya, all of Yokkaichi, Japan

[73] Assignee: Mitsubishi Gas Chemical Company, Inc., Tokyo, Japan

[21] Appl. No.: 09/094,484

[22] Filed: Jun. 10, 1998

[30] Foreign Application Priority Data

Jun. 19, 1997 [JP] Japan ................................. 9-162632

[51] Int. Cl.⁶ .................................................. C01B 15/037
[52] U.S. Cl. ............................................................ 423/273
[58] Field of Search ............................................... 423/273

[56] References Cited

U.S. PATENT DOCUMENTS 2,680,674 9/1954 Cooper et al. .
4,534,945 8/1985 Hopkins et al. .
4,636,368 1/1987 Pralus ...................................... 423/273

FOREIGN PATENT DOCUMENTS 1056121 1/1967 United Kingdom .

OTHER PUBLICATIONS

Chemical Abstracts Citation 121:164694 (no date available).
Chemical Abstracts Citation 74:105337 (no date available).
Lyakhov, B. F., et al.: "Increasing the stability of hydrogen peroxide and titanium peroxy compounds in alkaline solutions and cyanide electrolytes for cadmium and zinc electroplating", (1987), *Chemical Abstracts* 106:184,906.

*Primary Examiner*—Wayne Langel
*Attorney, Agent, or Firm*—Antonelli, Terry, Stout & Kraus, LLP

[57] ABSTRACT

A stabilized aqueous solution of hydrogen peroxide comprising at least one metal element selected from the group consisting of tantalum, zirconium, and niobium.

The aqueous solution of hydrogen peroxide has excellent storage stability and heat stability.

9 Claims, No Drawings

STABILIZED AQUEOUS SOLUTION OF HYDROGEN PEROXIDE

BACKGROUND OF THE INVENTION

1. Field of the Invention

The present invention relates to a stabilized aqueous solution of hydrogen peroxide, and more particularly, to an aqueous solution of hydrogen peroxide which comprises a small amount of a metal element, such as tantalum, zirconium, and niobium, and has excellent storage stability and heat stability.

2. Description of the Related Arts

Hydrogen peroxide is an inorganic industrial material useful as an oxidizing agent. Hydrogen peroxide has widely been used for bleaching fiber and pulp, as germicides, in organic synthetic reactions, and in recent years, for cleaning wafers in the electronic industry. Various stabilizers are generally added to an aqueous solution of hydrogen peroxide to prevent decrease in the concentration of hydrogen peroxide during transportation and storage before the solution is used for the above applications.

The concentration of hydrogen peroxide in an aqueous solution of hydrogen peroxide is decreased mainly because hydrogen peroxide is catalytically decomposed by various metal impurities contained in the solution.

To prevent decomposition of hydrogen peroxide by masking (or sealing) these metals which catalytically decompose hydrogen peroxide, inorganic salts, such as pyrophosphates and stannates, or organic compounds, such as organic chelating agents and organic acids, are added to the solution. Introductory description on decomposition of hydrogen peroxide, elements and compounds showing the catalytic activity for decomposition of hydrogen peroxide, and methods for stabilizing an aqueous solution of hydrogen peroxide can be found in "Hydrogen Peroxide" by SCHUMB et al., published by REINHOLD Publishing Company, New York (1955), pages 447 to 539.

Typical examples of the widely used inorganic stabilizer include phosphates, pyrophosphates, and stannates. These stabilizers are used in large amounts because of low prices. Among these stabilizers, phosphates must be added to an aqueous solution of hydrogen peroxide in large amounts because the single use of a phosphate shows only a limited effect to stabilize hydrogen peroxide although degradation of phosphates by hydrogen peroxide is small.

Solutions for treatment of wafers in the electronic industry, food additives, and germicides are the major areas of application of hydrogen peroxide in recent years. Decrease in the amount of a stabilizer is required in all these applications. When a solution containing a large amount of a stabilizer is vaporized after use, the amount of a residue is increased, and the use of a stabilizer in a large amount is not preferable.

Pyrophosphates which are considered to be effective for masking metal impurities have a drawback in that pyrophosphates are decomposed into orthophosphoric acid in an aqueous solution of hydrogen peroxide at high temperatures to decrease the effect of masking metal impurities to the level shown by phosphates.

Stannates have a drawback in that excessive elusion of aluminum takes place when stannates are stored in a vessel made of aluminum, and the eluted aluminum causes precipitation of stannates themselves. Therefore, stannates cannot be used for practical applications.

As the organic chelate compounds which are considered to be effective, for example, chelate compounds derived from phosphonic acid, such as ethylenediaminetetramethylene(phosphonic acid), ethylenediaminetetraacetic acid, and nitrilotriacetic acid, are described in Japanese Patent Publication Showa 50(1975)-36838. Among these chelate compounds, ethylenediaminetetraacetic acid and nitrilotriacetic acid have a drawback in that these compounds containing nitrogen are decomposed with hydrogen peroxide in a long period of time to cause decrease in the stabilizing effect although these compounds show an effective stabilizing effect in the initial period of the use and are not suitable for using for a long period of time.

Chelate compounds derived from phosphonic acid markedly corrode materials of tanks and vessels during storage to cause elution of metal impurities having activity for decomposition of hydrogen peroxide although these chelate compounds show strong ability to prevent decomposition of hydrogen peroxide, Therefore, a large amount of a corrosion inhibitor for metals, such as sodium nitrate and ammonium nitrate, must be used in combination. This causes the same drawback as that described above in that the amount of a residue after vaporization is increased, and the solution can be used only for limited applications. Moreover, these organic chelate compounds have another drawback in that these compounds are expensive, and the production cost is increased.

As the other organic compounds used as the stabilizer, many organic compounds, such as organic hydroxyl compounds, diglycolic acids, organic sulfonic acids, acylation products of phosphorous acid, phenanthroline, aminotriazines, and acetoanilide, are known. However, these organic compounds have drawbacks in that the single use of these compounds shows a small effect of stabilization, and that these compounds are degraded by oxidation with hydrogen peroxide and the effect of stabilization is lost. Therefore, these compounds cannot practically be used particularly when the solution must be stored for a long period of time or has a high concentration of hydrogen peroxide.

SUMMARY OF THE INVENTION

The object of the present invention is to develop a stabilizer which is not affected by the concentration of hydrogen peroxide in the aqueous solution to which the stabilizer is added and enables sustained stabilization of an aqueous solution of hydrogen peroxide by addition of the stabilizer in a small amount, and, as the result, to provide an aqueous solution of hydrogen peroxide showing a small loss by decomposition and having excellent heat stability.

As the result of intensive studies to solve the above problems, it was found that hydrogen peroxide was not decomposed when compounds containing tantalum, zirconium, or niobium, among various metal elements, were added to an aqueous solution of hydrogen peroxide, and this condition of suppressed decomposition of hydrogen peroxide was sustained. The present invention has been completed on the basis of this knowledge.

Accordingly, the present invention provides a stabilized aqueous solution of hydrogen peroxide comprising at least one metal element selected from the group consisting of tantalum, zirconium, and niobium.

DESCRIPTION OF THE PREFERRED EMBODIMENTS

In the present invention, an aqueous solution of hydrogen peroxide shows sustained stability and is provided with excellent heat stability by stabilizing the aqueous solution of hydrogen peroxide by the addition of at least one metal element selected from the group consisting of tantalum, zirconium, and niobium which show no activity to decompose hydrogen peroxide when used alone.

Among these three metal elements having the effect of stabilizing an aqueous solution of hydrogen peroxide, niobium and tantalum are preferable, and tantalum is more preferable.

In the present invention, an ion or a compound containing one of these metal elements is added to an aqueous solution of hydrogen peroxide. Two or more ions or compounds containing these elements may also be added, where necessary.

In the present invention, the above metal elements may be used, as described above, in the form of ions or compounds containing oxygen, such as hydroxides and oxides, inorganic compounds, such as sulfates, nitrates, borates, phosphates, and carbonates, and organic compounds, such as acetates, oxalates, and citrates. The metal elements in all these forms exhibit the excellent effect of stabilizing an aqueous solution of hydrogen peroxide.

The form of the species containing tantalum as the metal element is not particularly limited in the present invention and may suitably be selected from ions, compounds soluble in water, and acidic solutions which can be uniformly mixed with an aqueous solution of hydrogen peroxide after being added to the solution. In the present invention, preferable examples include tantalum fluoride and sodium octafluorotantalate.

Because many compounds of tantalum used as the species containing the metal element show small solubility in water and hydrogen peroxide, these compounds may be dissolved in an inorganic acid which does not decompose hydrogen peroxide in an aqueous solution, such as nitric acid and sulfuric acid. The prepared solution is adjusted to a suitable concentration and added to an aqueous solution of hydrogen peroxide.

In the present invention, the amount of tantalum added to the aqueous solution of hydrogen peroxide as the metal element is in the range of 0.01 to 50 ppm by weight, preferably in the range of 0.05 to 50 ppm by weight, more preferably 0.7 to 20 ppm by weight, most preferably 1 to 10 ppm by weight.

When the amount is less than the above lower limit, a sufficient stability cannot be obtained. When the amount exceeds the above upper limit, the stability is rather decreased, cost is increased, and the amount of a residue is increased. Therefore, such amounts are not preferable.

Metal impurities which catalytically decompose hydrogen peroxide are contained in practically used aqueous solutions of hydrogen peroxide. The above amount of tantalum generally varies depending on the concentrations of these impurities.

Similarly to the species containing tantalum as the metal element, the form of the species containing niobium as the metal element is not particularly limited in the present invention and may suitably be selected from ions, compounds soluble in water, and acidic solutions which can be uniformly mixed with an aqueous solution of hydrogen peroxide after being added to the solution. In the present invention, preferable examples include niobium oxide in sulfuric acid, niobium carbonate in nitric acid, hydrogen niobium oxalate in oxalic acid, potassium heptafluoroniobate, and potassium heptafluorooxoniobate hydrate.

Because many compounds of niobium used as the metal element show small solubility in water and hydrogen peroxide similarly to compounds of tantalum used as the metal element, these compounds may be dissolved in an inorganic acid which does not decompose hydrogen peroxide in an aqueous solution, such as nitric acid and sulfuric acid. Niobium oxide in sulfuric acid shown above is an example of such cases. The prepared solution is adjusted to a suitable concentration and added to an aqueous solution of hydrogen peroxide.

In the present invention, the amount of niobium added to the aqueous solution of hydrogen peroxide as the metal element is practically in the range of 0.01 to 50 ppm by weight, preferably in the range of 0.10 to 30 ppm by weight, more preferably 0.3 to 20 ppm by weight, most preferably 0.7 to 3 ppm by weight although, similarly to the amount of tantalum used as the metal element, the amount cannot generally be specified because the amount is varied depending on the concentrations of metal impurities which catalytically decompose hydrogen peroxide in the aqueous solution of hydrogen peroxide.

Similarly to the amount of tantalum used as the metal element, a sufficient stability cannot be obtained when the amount of niobium is less than the above lower limit. When the amount of niobium exceeds the above upper limit, the stability is rather decreased, cost is increased, and the amount of a residue is increased. Therefore, such amounts are not preferable.

Similarly to the species containing tantalum or niobium as the metal elements, the form of the species containing zirconium as the metal element is not particularly limited in the present invention and may suitably be selected from ions, compounds soluble in water, and acidic solutions which can be uniformly mixed with an aqueous solution of hydrogen peroxide after being added to the solution. In the present invention, preferable examples include zirconyl nitrate pentahydrate, zirconium dinitrate oxide dihydrate, zirconium sulfate tetrahydrate, ammonium zirconium carbonate, and sodium hexafluorozirconate.

Similarly to the above metal elements, compounds showing small solubility in water and hydrogen peroxide, such as zirconyl hydroxide, zirconyl oxides, acetates such as zirconium acetate, and oxalates such as zirconium oxalate, may be dissolved in an inorganic acid which does not decompose hydrogen peroxide in an aqueous solution, such as nitric acid and sulfuric acid.

In the present invention, the amount of zirconium added as the metal element to an aqueous solution of hydrogen peroxide is practically in the range of 0.01 to 50 ppm by weight, preferably in the range of 0.05 to 20 ppm by weight, more preferably 0.3 to 10 ppm by weight, most preferably 0.7 to 3 ppm by weight although, similarly to the amount of tantalum or niobium used the metal elements, the amount cannot generally be specified because the amount is varied depending on the concentrations of metal impurities which catalytically decompose hydrogen peroxide in the aqueous solution of hydrogen peroxide.

Similarly to the amount of tantalum or niobium used as the metal element, a sufficient stability cannot be obtained when the amount of zirconium is less than the above lower limit. When the amount of zirconium exceeds the above upper limit, the stability is rather decreased, cost is increased, and the amount of a residue is increased. Therefore, such amounts are not preferable.

When the species containing tantalum, niobium, or zirconium as the metal element is added to an aqueous solution of hydrogen peroxide, the species soluble in water can be added directly as a liquid or a solid. The species containing the metal element may also be added in the form of a master batch which is prepared by dissolving the metal element in water, hydrogen peroxide or an inorganic acid which does not decompose hydrogen peroxide, such as nitric acid and sulfuric acid. The species containing the metal element may also be added in combination with other stabilizers or auxiliary stabilizers. Compounds having small solubility in water and hydrogen peroxide may be added after the compounds are dissolved into an inorganic acid or organic acid which does not decompose hydrogen peroxide as described above and the prepared solution is adjusted to have a suitable concentration.

The concentration of hydrogen peroxide in the aqueous solution used in the present invention is not limited to the general range of the concentration in commercially available aqueous solution of hydrogen peroxide, i.e., 1 to 90% by weight. It is preferable that an aqueous solution of hydrogen peroxide stabilized by adding an ion or a compound of tantalum, niobium, or zirconium has a concentration of hydrogen peroxide in the range of 20 to 70% by weight.

In the present invention, as the inorganic acid and the organic acid which are used for dissolving compounds of tantalum, niobium, or zirconium having small solubility in water and hydrogen peroxide, acids which do not decomposed hydrogen peroxide and selected from inorganic acids, such as nitric acid, sulfuric acid, hydrofluoric acid, and hydrochloric acid, and organic acids, such as benzoic acid, citric acid, oxalic acid, salicylic acid, and acetic acid, can be used singly or as a combination of two or more types.

The amount of the above acid is varied depending on the compound to be dissolved and cannot generally be specified. A suitable amount can be decided because the use in an excessive amount deteriorates stability of hydrogen peroxide.

In the present invention, inorganic acids which do not decompose hydrogen peroxide, such as nitric acid, sulfuric acid, hydrofluoric acid, and hydrochloric acid, may be added to an aqueous solution of hydrogen peroxide in a desired amount in accordance with the purpose of using the solution, such as surface treatment of metals.

Agents for adjusting pH, such as borates, isotonic agents, such as sodium chloride, and auxiliary stabilizers, such as sodium silicate and magnesium silicate, may be added to an aqueous solution of hydrogen peroxide singly or as a combination.

As described above, the aqueous solution of hydrogen peroxide of the present invention can be stabilized without using various conventional stabilizers for an aqueous solution of hydrogen peroxide in combination.

To summarize the advantages of the present invention, an aqueous solution of hydrogen peroxide having excellent storage stability and heat stability is provided by addition of a small amount of an ion or a compound of tantalum, niobium, or zirconium to the solution as a species containing a metal element.

The additives are used in very small amounts and are less expensive than conventionally used organic chelate compounds. Therefore, the additives are economically advantageous stabilizers.

EXAMPLES

The present invention is described more specifically with reference to an example and comparative examples. However, the present invention is not limited by the example and the comparative examples.

Example 1

Stabilized aqueous solutions of hydrogen peroxide were prepared by adding 0.05 to 50 ppm by weight of tantalum, niobium, or zirconium (each using a corresponding standard solution of 1,000 ppm for the atomic absorption analysis manufactured by KANTO KAGAKU Co., Ltd.) and 1 ppb by weight each of iron and chromium having the activity to decompose hydrogen peroxide (each using a corresponding standard solution of 1,000 ppm for the atomic absorption analysis manufactured by KANTO KAGAKU Co., Ltd.) to a commercial 31.2% by weight aqueous solution of hydrogen peroxide (manufactured by MITSUBISHI GAS CHEMICAL Co., Ltd. and KANTO KAGAKU Co., Ltd., a reagent grade for the electronic industry), and the stability of the prepared solutions were obtained in accordance with the method of measurement of stability of industrial hydrogen peroxide described in Chapter 5.5 of Japanese Industrial Standard K-1463 (1971). In this method, a specific amount of a sample is placed in a measuring flask made of a hard glass, and the measuring flask was heated for 5 hours in a boiling water bath while the marked line is placed under the surface of water. The concentrations of hydrogen peroxide in the sample before and after the heat treatment are obtained by titration using a 1/10 N potassium permanganate solution (Japanese Industrial Standard K-1463, Chapter 5.4.2). The residual fraction of hydrogen peroxide after 5 hours is obtained in accordance with the following equation, and the obtained number is used for evaluating the stability.

Stability $H = J'/J \times 100$

H: stability (%)

J': the concentration of hydrogen peroxide (%) after heating for 5 hours

J: the concentration of hydrogen peroxide (%) before heating

The results of the stability tests are shown in Table 1.

TABLE 1-1

| stabilizer | stability (%) amount (ppm) | | | | | |
|---|---|---|---|---|---|---|
| | 0.05 | 0.10 | 0.30 | 0.50 | 0.70 | 1.00 |
| Ta | 97.21 | 97.67 | 98.34 | 98.53 | 99.22 | 99.51 |
| Nb | — | 97.33 | 98.89 | 98.86 | 99.48 | 99.45 |
| Zr | 97.33 | 97.41 | 98.27 | 98.71 | 99.13 | 99.16 |

TABLE 1-2

| stabilizer | stability (%) amount (ppm) | | | | | |
|---|---|---|---|---|---|---|
| | 3.00 | 5.00 | 10.00 | 20.00 | 30.00 | 50.00 |
| Ta | 99.85 | 99.73 | 99.60 | 99.25 | 97.25 | 98.27 |
| Nb | 99.61 | 99.54 | 99.01 | 98.76 | 98.45 | — |
| Zr | 98.79 | — | 98.10 | 98.01 | — | — |

As clearly shown in Table 1, the species containing tantalum as the metal element is most excellent among the above three species used as the stabilizer.

Comparative Example 1

An aqueous solution of hydrogen peroxide was prepared by adding 1 ppb by weight each of iron and chromium having the activity to decompose hydrogen peroxide (each using a corresponding standard solution of 1,000 ppm for the atomic absorption analysis manufactured by KANTO KAGAKU Co., Ltd.) to a commercial aqueous solution of hydrogen peroxide used in Example 1, and, without adding any metal element showing the stabilizing effect, the stability test of the prepared solution was conducted in accordance with the same procedures as those conducted in Example 1. As the result, the stability was found to be 96.5%.

Comparative Example 2

An aqueous solution of hydrogen peroxide was prepared by adding 1 ppb by weight each of iron and chromium having the activity to decompose hydrogen peroxide (each using a corresponding standard solution of 1,000 ppm for the atomic absorption analysis manufactured by KANTO KAGAKU Co., Ltd.) to a commercial aqueous solution of hydrogen peroxide used in Example 1, and, after adding 1 ppm by weight of sodium hydrogenpyrophosphate which is a conventionally used stabilizer for hydrogen peroxide, the stability test of the prepared solution was conducted in accordance with the same procedures as those conducted in Example 1. As the result, the stability was found to be 97.4%.

Comparative Example 3

An aqueous solution of hydrogen peroxide was prepared by adding 1 ppb by weight each of iron and chromium having the activity to decompose hydrogen peroxide (each using a corresponding standard solution of 1,000 ppm for the atomic absorption analysis manufactured by KANTO KAGAKU Co., Ltd.) to a commercial aqueous solution of hydrogen peroxide used in Example 1, and, after adding 1 ppm by weight of nitric acid, the stability test of the prepared solution was conducted in accordance with the same procedures as those conducted in Example 1. As the result, the stability was found to be 97.3%.

What is claimed is:

1. A stabilized aqueous solution of hydrogen peroxide comprising at least one metal element selected from the group consisting of tantalum, zirconium, and niobium, wherein a concentration of the metal element in the aqueous solution of hydrogen peroxide is in a range of 0.01 to 50 ppm by weight.

2. A solution according to claim 1, which comprises the metal element in a form of an ion or a compound containing the metal element.

3. A solution according to claim 1, wherein the aqueous solution contains tantalum, and a concentration of tantalum in the aqueous solution of hydrogen peroxide is in a range of 0.05 to 50 ppm by weight.

4. A solution according to claim 1, wherein the aqueous solution contains zirconium, and a concentration of zirconium in the aqueous solution of hydrogen peroxide is in a range of 0.05 to 20 ppm by weight.

5. A solution according to claim 1, wherein the aqueous solution contains niobium, and a concentration of niobium in the aqueous solution of hydrogen peroxide is in a range of 0.10 to 30 ppm by weight.

6. A solution according to claim 3, wherein the tantalum is in a form of tantalum fluoride or sodium octafluorotantalate.

7. A solution according to claim 4, wherein the zirconium is in a form of zirconyl nitrate pentohydrate, zirconium dinitrate oxide dihydrate, zirconium sulfate tetrahydrate, ammonium zirconium carbonate or sodium hexafluorozirconate.

8. A solution according to claim 5, wherein the niobium is in a form of niobium oxide in sulfuric acid, niobium carbonate in nitric acid, hydrogen niobium oxalate in oxalic acid, potassium heptafluoroniobate or potassium heptafluorooxoniobate hydrate.

9. A stabilized aqueous solution of hydrogen peroxide comprising tantalum.

* * * * *